(12) United States Patent
Lee et al.

(10) Patent No.: US 8,947,687 B2
(45) Date of Patent: Feb. 3, 2015

(54) IMAGE FORMING APPARATUS AND METHOD OF DISPLAYING OPTION SCREEN THEREOF

(75) Inventors: Si-eun Lee, Gwangmyeong-si (KR); Ho-sung Han, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 69 days.

(21) Appl. No.: 13/591,703

(22) Filed: Aug. 22, 2012

(65) Prior Publication Data

US 2013/0169986 A1 Jul. 4, 2013

(30) Foreign Application Priority Data

Dec. 28, 2011 (KR) .................. 10-2011-0145012

(51) Int. Cl.
*G06F 15/00* (2006.01)
*G06F 3/12* (2006.01)
*G06K 1/00* (2006.01)
*H04N 1/00* (2006.01)
*G06F 3/01* (2006.01)

(52) U.S. Cl.
CPC ............... *H04N 1/0035* (2013.01); *G06F 3/01* (2013.01)
USPC ........................................ 358/1.13; 358/1.1

(58) Field of Classification Search
CPC ................................ G06F 3/01; H04N 1/0035
USPC ................................ 358/1.1, 1.13, 1.14, 1.15
See application file for complete search history.

(56) References Cited

U.S. PATENT DOCUMENTS 8,218,174 B2 * 7/2012 Willis et al. .................. 358/1.15

* cited by examiner

*Primary Examiner* — Douglas Tran
(74) *Attorney, Agent, or Firm* — Staas & Halsey LLP

(57) ABSTRACT

A method of displaying an option screen in an image forming apparatus includes determining at least one operation option corresponding each of two or more image forming functions, among image forming functions provided by the image forming apparatus; generating an option screen in which regions for setting the operation options determined with respect to the two or more image forming functions are arranged in a same screen; and displaying the generated option screen through a user interface unit.

20 Claims, 8 Drawing Sheets

IMAGE FORMING APPARATUS AND METHOD OF DISPLAYING OPTION SCREEN THEREOF

CROSS-REFERENCE TO RELATED APPLICATIONS

This application claims the benefit of Korean Patent Application No. 10-2011-0145012, filed on Dec. 28, 2011, in the Korean Intellectual Property Office, the disclosure of which is incorporated herein in its entirety by reference.

BACKGROUND

1. Field

The present invention relates to an image forming apparatus and a method of displaying option screen in the image forming apparatus.

2. Description of the Related Art

Image forming apparatuses including printers, scanners, and multi-function peripherals perform at least one or more functions among such functions of printing, scanning, copying, fax sending/receiving, e-mail transmission, and file transmission to a server. Before performing the above image forming functions, the image forming apparatus displays an option screen through a user interface in order to receive options for performing the image forming functions from a user. When the user sets options through the displayed option screen, the image forming apparatus performs each of the image forming functions based on the set options.

SUMMARY

Additional aspects and/or advantages will be set forth in part in the description which follows and, in part, will be apparent from the description, or may be learned by practice of the invention.

The present disclosure provides an image forming apparatus and a method of displaying an option screen in which operation options about image forming functions provided by the image forming apparatus are displayed in one screen.

The present disclosure also provides a non-transitory computer readable recording medium having embodied thereon a program for executing the above method in a computer.

According to an aspect, there is provided a method of displaying an option screen in an image forming apparatus, the method including: determining at least one operation option corresponding each of two or more image forming functions, among image forming functions provided by the image forming apparatus; generating an option screen in which regions for setting the operation options determined with respect to the two or more image forming functions are arranged in a same screen; and displaying the generated option screen through a user interface unit.

According to another aspect, there is provided a computer readable recording medium having embodied thereon a program for executing the above method.

According to another aspect, there is provided an image forming apparatus displaying an option screen, the image forming apparatus including: an option determination unit for determining at least one operation option corresponding to each of two or more image forming functions provided by the image forming apparatus; a screen generation unit for generating an option screen, in which regions for setting the operation options determined with respect to each of the two or more image forming functions are arranged in the same screen; and a user interface unit for displaying the generated option screen.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

Hereinafter, embodiments of the present invention will be described with reference to accompanying drawings. Expressions such as "at least one of," when preceding a list of elements, modify the entire list of elements and do not modify the individual elements of the list.

Figure 1:
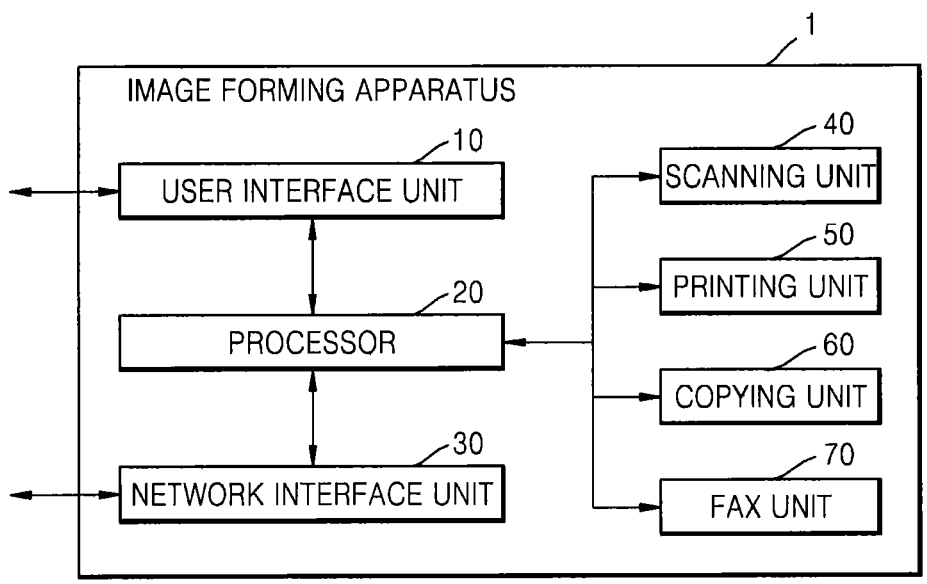
FIG. 1 is a block diagram of an image forming apparatus according to an embodiment of the present invention.

FIG. 1 is a block diagram of an image forming apparatus 1 according to an embodiment of the present invention. Referring to FIG. 1, the image forming apparatus 1 includes a user interface unit 10, a processor 20, a network interface unit 30, a scanning unit 40, a printing unit 50, a copying unit 60, and a fax unit 70. In FIG. 1, hardware components are only shown in order to clarify features of the present embodiment. However, one of ordinary skill in the art would appreciate that the image forming apparatus 1 of the present embodiment other universal hardware components besides the hardware components shown in FIG. 1.

The image forming apparatus 10 may be a multi-function peripheral (MFP) that may perform functions such as copying, printing, scanning, fax sending/receiving, or e-mail transmitting in one apparatus. Hereinafter, a case where the image forming apparatus 1 is an MFP will be described for the convenience of description; however, the present embodiment is not limited thereto.

The image forming apparatus 1 performs image forming operations such as a scanning operation by using the scanning unit 40, a printing operation by using the printing unit 50, a copying operation by using the copying unit 60, a fax operation by using the fax unit 70, or an e-mail transmission operation by using the network interface unit 30. In addition, in order to perform such image forming operations, operation options corresponding to each of the image forming operations have to be set.

The operation options according to the present embodiment denote detailed operation operations that may be directly applied to perform the image forming functions, for example, the number of sheets to be copied, magnification/reduction ratio, scanning path, e-mail address, and fax number.

The process of setting the operation options as described above are performed by displaying the operation operations to the user through the user interface unit 10, and by inputting setting values of the displayed operation options through the user interface unit 10.

That is, the user interface unit 10 receives information input by the user, or outputs information processed in the image forming apparatus 1 to the user. For example, the user interface unit 10 may include a display unit (not shown) and an input unit (not shown).

In more detail, the user interface unit 10 acquires information from the user via the input unit (not shown) such as a keyboard, a mouse, a touch screen, and a voice recognition. Moreover, the user interface unit 10 includes the display unit (not shown), for example, a display, a liquid crystal display (LCD), or a light emitting diode (LED), displaying visible information in order to report the information to the user.

In the present embodiment, a case where the user inputs the information by using the input unit (not shown) such as a touch screen in the user interface unit 10, will be described as an example for the convenience of description. However, one of ordinary skill in the art would appreciate that the user may input the information by using hardware buttons disposed on the image forming apparatus 1 according to the user interface unit 10 of the present embodiment.

The image forming apparatus 1 may display operation options about the image forming operations through the user interface unit 10. In addition, the image forming apparatus 1 receives the input of the user via the user interface unit 10 such that the operation operations about the image forming functions may be set.

Hierarchical class menus are only displayed on one screen of the user interface unit 10. In addition, detailed operation options for one image forming function are only displayed on one screen of the user interface unit 10 conventionally, and thus detailed operation options for various image forming functions may not be displayed on one screen.

Figure 2A:
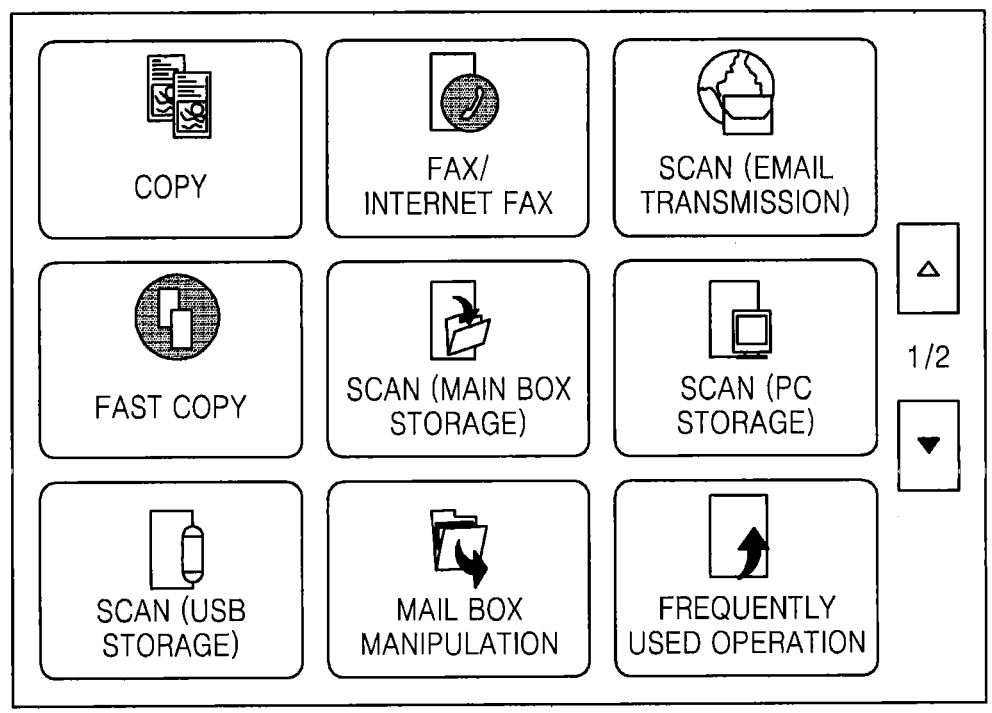
FIGS. 2A and 2B are diagrams of option screens displayed on a user interface according to the conventional art.
Figure 2B:
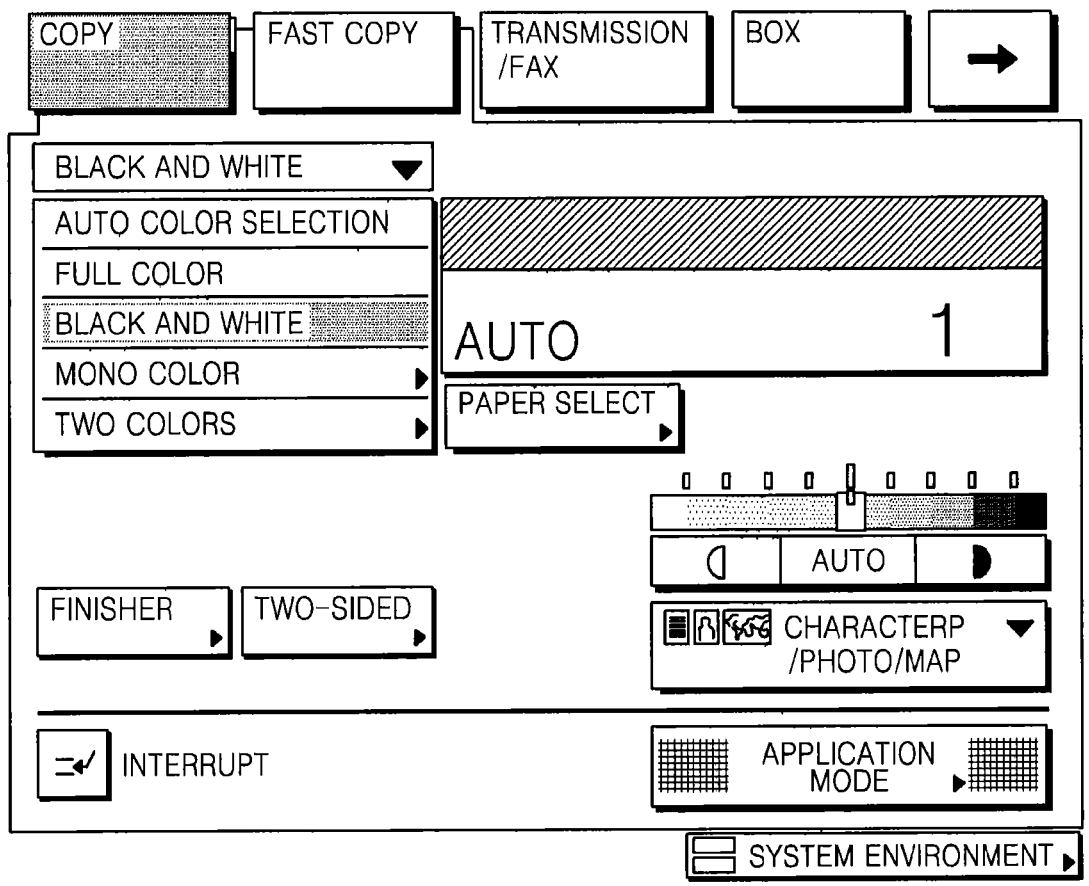

FIGS. 2A and 2B are diagrams showing option screens displayed on the user interface unit 10 according to the conventional art.

Referring to FIG. 2A, menus corresponding to kinds of the image forming functions, for example, copy, fax, scan, etc., are displayed on one screen in the user interface unit 10, and detailed operation options for various image forming functions are not displayed at the same time. In addition, referring to FIG. 2B, in a case of the copying function, for example, operation options for the copying function are only disposed on the user interface unit 10, and thus the user has to transfer or move to other option screens in order to set operation options for other image forming functions such as the scanning, and printing operations.

However, according to the image forming apparatus 1 of the present embodiment, the operation options for various kinds of image forming functions may be set at once while minimizing transferring or moving of the screen in the user interface unit 10. That is, an all-in-one screen, in which operation options for the image forming functions may be displayed together, is provided, and thus the user may easily and rapidly input the operation options in one screen. Hereinafter, operations of the image forming apparatus 1 providing the option screen in which the operation options for various kinds of image forming functions are displayed will be described as follows.

Figure 3:
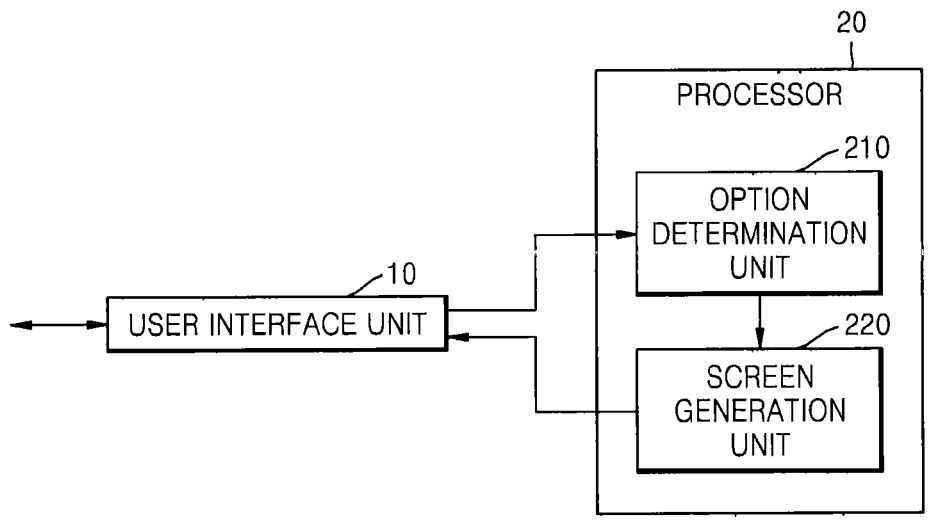
FIG. 3 is a block diagram of a user interface unit and a processor according to an embodiment of the present invention.

FIG. 3 is a block diagram of the user interface unit 10 and a processor 20 in the image forming apparatus 1 of the present embodiment. Referring to FIG. 3, the processor 20 includes an option determination unit 210 and a screen generation unit 220. The processor 20 may be realized by an array of a plurality of logic gates, or may be realized by a combination of a universal microprocessor and a memory storing a program that is executed in the microprocessor. Otherwise, the processor 20 may be realized as another type of hardware.

The option determination unit 210 determines at least one operation option corresponding to each of the two or more image forming functions supported by the image forming apparatus 1. For example, the image forming functions of the image forming apparatus 1 of the present embodiment include at least two or more among the printing function, the scanning function, the copying function, the fax function, and the e-mail transmission.

For example, the option determination unit 210 determines at least one operation option among the operation options for the printing function, for example, the number of sheets to be printed, a size of a printing medium, a printing ratio, and a printing page setting. In addition, the option determination unit 210 determines at least one operation option among the operation options for the copying function, for example, the number of sheets to be printed and a size of the medium. Moreover, the option determination unit 210 determines at least one operation option among the operation options for the scanning function, for example, fax number and a size of fax medium.

That is, the option determination unit 210 determines at least one operation option corresponding to each of the two or more image forming functions, that is, the printing, the copying, and the scanning functions.

According to an embodiment, the option determination unit 210 may determine at least one operation option based on the kinds of operation options that have to be input by the user in order to perform the image forming functions.

In more detail, if fax number of a counterpart, to which a fax is to be transmitted through the fax unit 70, is not input through the user interface unit 10, the image forming apparatus 1 may not perform the fax function. In addition, if a path for storing or transmitting a result of scanning operation by the scanning unit 40 is not input through the user interface unit 10, the image forming apparatus 1 may not perform the scanning function.

Therefore, the option determination unit 210 may determine the operation options in consideration of the options that are essential for performing the each of the image forming functions.

According to an embodiment, the option determination unit 210 may determine at least one operation option in consideration of a size of one screen of the user interface unit 10.

If too many operation options for each of the two or more image forming functions are determined, the operation options may not be displayed in the same screen, or may be displayed too small to be recognized.

The screen generation unit 220 generates an option screen, in which regions for setting the operation operations determined with respect to each of the two or more image forming functions are displayed. This will be described in more detail with reference to FIG. 4.

Figure 4:
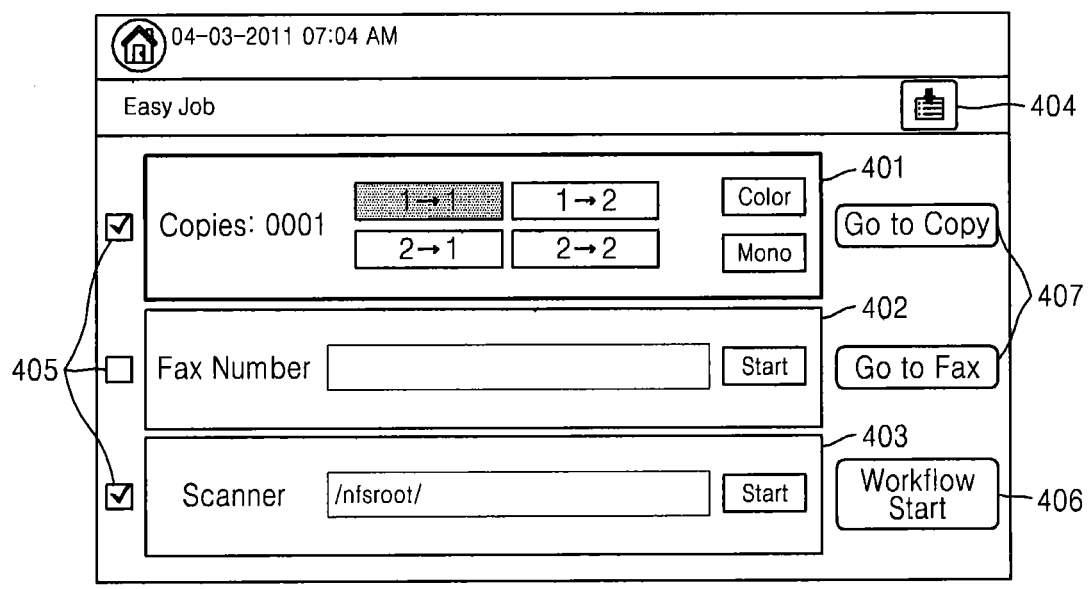
FIG. 4 is a diagram showing an option screen generated by a screen generator according to an embodiment of the present invention.

FIG. 4 is a diagram showing an example of the option screen generated by the screen generation unit 220 according to the embodiment of the present invention. When the operation options with respect to the copying function, the fax function, and the scanning function are determined in the option determination unit 210, the screen generation unit 220 generates the option screen shown in FIG. 4, in which a region 401 for setting the operation options determined with respect to the copying function, a region 402 for setting the operation options determined with respect to the fax function, and a region 403 for setting the operation options determined with respect to the scanning function are displayed in the same screen.

In addition, the screen generation unit 220 may generate the option screen further including at least one of a button 404 for changing the option screen for setting other operation options besides the determined operation options, a button 405 for selecting activation of each of the two or more image forming functions, a button 406 for executing a work flow operation, and a button 407 for starting each of the two or more image forming operations.

Referring to FIG. 3 again, the user interface unit 10 displays the option screen generated by the screen generation unit 220 as shown in FIG. 4. The user may identify the operation options with respect to each of the image forming functions from the option screen displayed on the user interface unit 10, and may set the operation options by inputting set values of the operation options through the user interface unit 10. That is, unlike the conventional art, the user may set the operation options with respect to various kinds of image forming functions at once in the same screen of the user interface unit 10.

If the image forming apparatus 1 does not include the fax unit 70, the user interface unit 10 may display the region 402 relating to the fax function in gray color in FIG. 4 in order to notify the user that the fax function is not activated. Here, basically at least one of the image forming functions is activated and displayed on the user interface unit 10.

Figure 5:
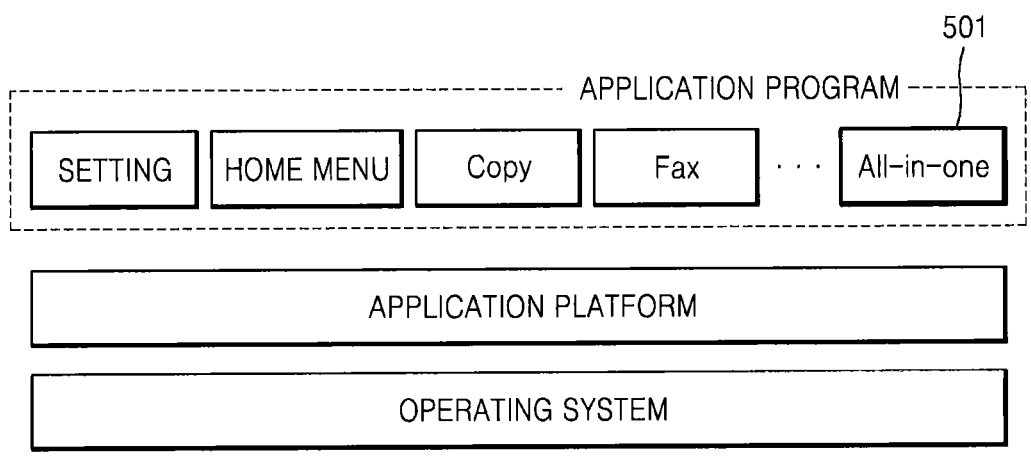
FIG. 5 is a block diagram of software operating in an image forming apparatus according to an embodiment of the present invention.

FIG. 5 is a block diagram showing software operated in the image forming apparatus 1 according to the embodiment of the present invention. Referring to FIG. 5, the image forming apparatus 1 may further include an all-in-one application program 501, besides other application programs that are generally operated in the image forming apparatus 1. Here, the all-in-one application program 501 is to generate the option screen as shown in FIG. 4, and when the user requests to execute the all-in-one application program 501, the user interface 10 may display the option screen as shown in FIG. 4.

Figure 6:
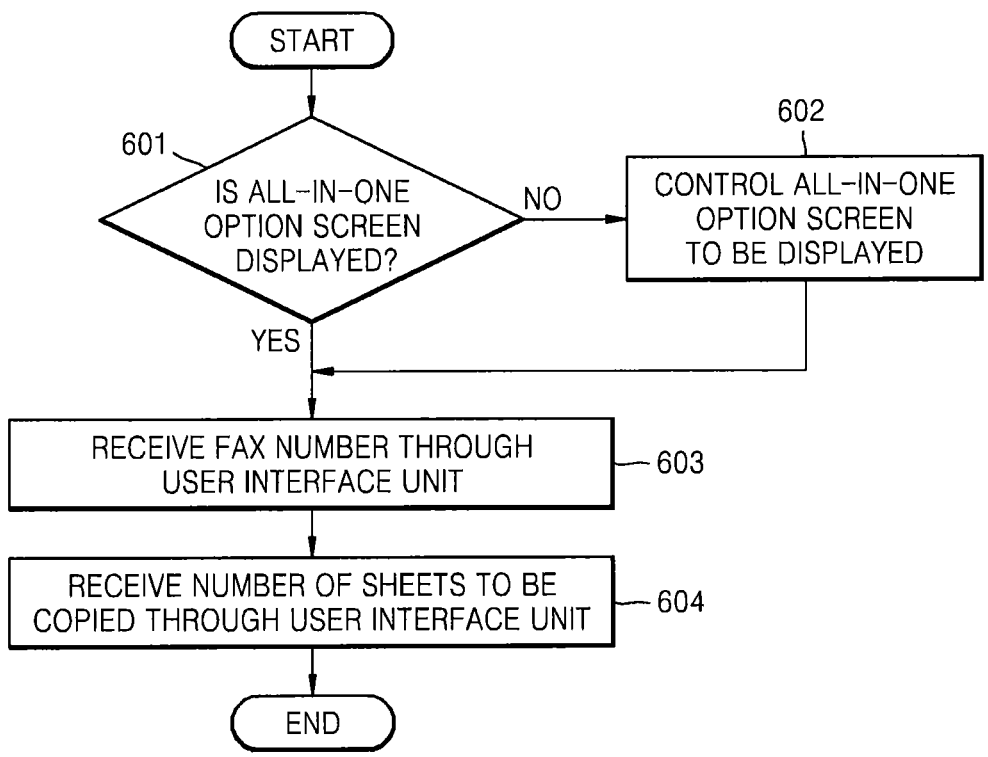
FIG. 6 is a flowchart illustrating processes of setting operation options about fax and copying functions through an option screen displayed on a user interface unit by a user in the image forming apparatus according to the embodiment of the present invention.

FIG. 6 is a flowchart illustrating processes of setting operation options with respect to the fax and copying functions through the option screen displayed on the user interface unit 10 according to the embodiment of the present invention. According to the present embodiment, the user may set the operation options through the option screen shown in FIG. 4 in the image forming apparatus 1 of FIG. 1.

In operation S601, the processor 20 determines whether the option screen of FIG. 4 is displayed on the user interface unit 10 according to the execution of the all-in-one application program.

In operation S602, when the user requests to operate the all-in-one application program, the processor 20 controls the user interface 10 to display the option screen of FIG. 4.

In operation S603, the user interface unit 10 receives fax number from the user in a case where the region 402 regarding the fax function is activated.

In operation S604, the user interface unit 10 receives the number of sheets to be copied from the user in a case where the region 401 regarding the copying function is activated.

As described above, according to the image forming apparatus 1 of the present embodiment, the operation options with respect to various kinds of image forming functions may be set in the same screen of the user interface unit 10 without moving or changing the screen.

Figure 7:
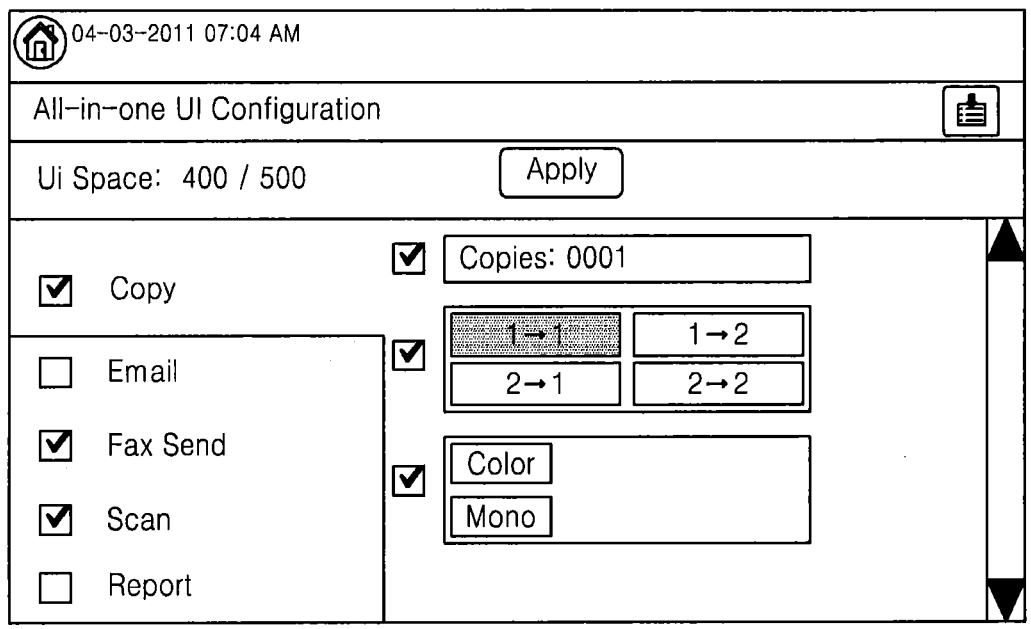
FIG. 7 is a block diagram of the user interface unit and a processor in the image forming apparatus according to the embodiment of the present invention.

FIG. 7 is a detailed block diagram of the user interface unit 10 and the processor 20 according to the present embodiment. Referring to FIG. 7, the processor 20 further includes an option edit unit 230 and a controller 240 in addition to the structure of the processor 20 shown in FIG. 3.

The option edit unit 230 edits the operation options that will be arranged in the option screen according to the input of the user. That is, when the user directly selects the operation options that will be displayed in the option screen through the user interface unit 10, the option edit unit 230 edits the operation options based on the input of the user. In addition, the option determination unit 210 determines at least one operation option based on the edition result.

Figure 8:
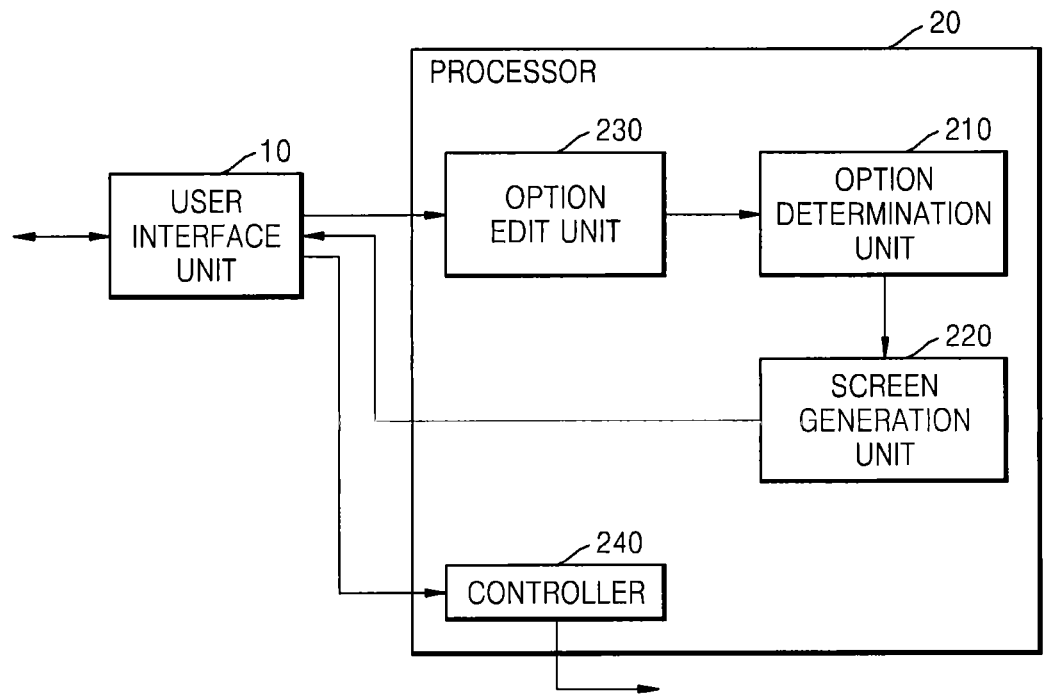
FIG. 8 is a diagram showing an option edition screen according to an embodiment of the present invention.

FIG. 8 is a diagram showing an option edit screen according to the embodiment of the present invention. The user may edits the operation options with respect to each of the copying, fax, and the scanning functions through the option edit screen shown in FIG. 8. The option edit unit 230 edits the operation options that will be arranged in the option screen according to the operation options selected by the user.

Referring to FIG. 7 again, when the input of the user about the operation options is received through the option screen displayed on the user interface unit 10, the controller 240 controls the image forming functions to be performed based on the input of the user with respect to the operation options. That is, the controller 240 controls the printing function, the copying function, the scanning function, the fax function, or the e-mail transmission function to be performed according to the set operation options.

When the controller 240 is asked to perform the image forming function in a state where the essential operation options are not set, the user interface unit 10 displays an error message notifying the user that the essential operation options are not set yet.

For example, if the fax number is two-digits or less, the user interface unit 10 displays a message such as "Enter a Fax No with Minimum 2 digits[0-9, * or #]".

When the operation options about the plurality of image forming functions are input and the plurality of image forming functions are controlled to be performed, if one image forming function is not performed, the controller 240 may control another image forming function to be performed first.

If a cause making one of the image forming functions not to be performed is that the essential operation options are not input, the controller 240 controls so that the essential operation options are set by showing a pop-up window or changing the option screen and the image forming functions are performed.

Figure 9:
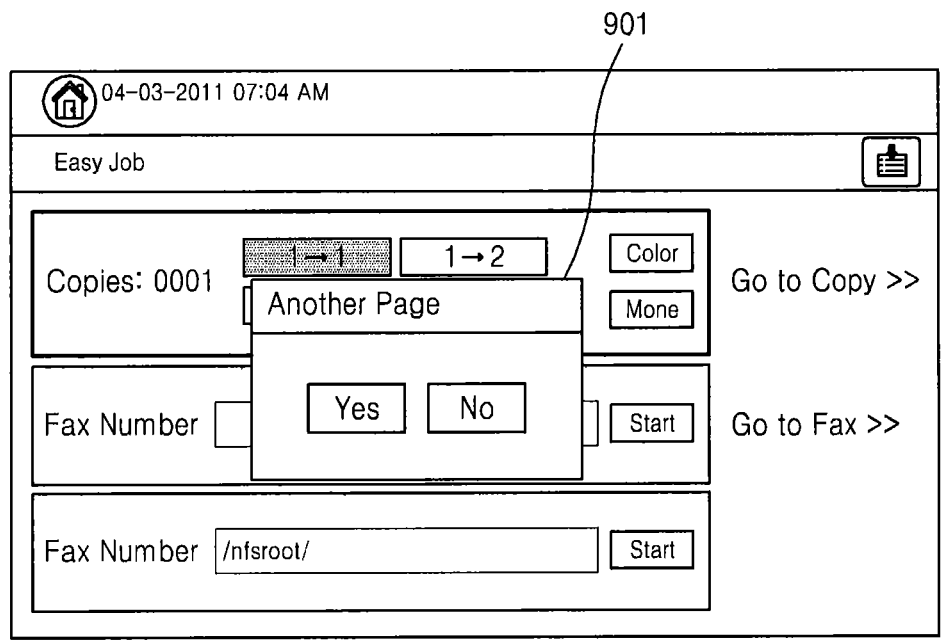
FIG. 9 is a diagram showing a pop-up window relating to essential operation options displayed on the user interface unit according to the embodiment of the present invention.

FIG. 9 is a diagram showing a pop-up window 901 relating to the essential operation options displayed on the user interface unit 10 according to the embodiment of the present invention. Referring to FIG. 9, when the controller 240 performs the scanning function of a document, for example, the user interface unit 10 displays a pop-up window for asking the user whether dual surfaces are to be scanned.

As described above, according to the present embodiment, the user interface unit 10 may set the operation operations relating to various kinds of image forming functions at the same time without changing the screen. On the other hand, the image forming apparatus 1 may execute a work flow operation for performing the various kinds of image forming functions at the same time.

In the option screen of FIG. 4, the button 405 for selecting the activation of each of the two or more image forming functions, and the button 406 for executing the work flow operation are displayed.

If the user pushes the button 405 for activating the copying function and the scanning function and the button 406 for executing the work flow operation in the option screen of FIG. 4, the copying function and the scanning function are performed in the work flow operation.

In more detail, when the button 406 for executing the work flow operation is input after setting all the operation options in the region 401 regarding the copying function and the region 403 regarding the scanning function, the controller 240 controls the copying function and the scanning function in the work flow operation.

At this time, the controller 240 controls overlapping image forming operations to be performed once in the two or more image forming functions, during the work-flow operation is performed. That is, in a case where an operation of converting the document into an image file is performed in both of the copying function and the scanning function, the controller 240 controls the operation of converting the document into the image file to be performed once.

Figure 10:
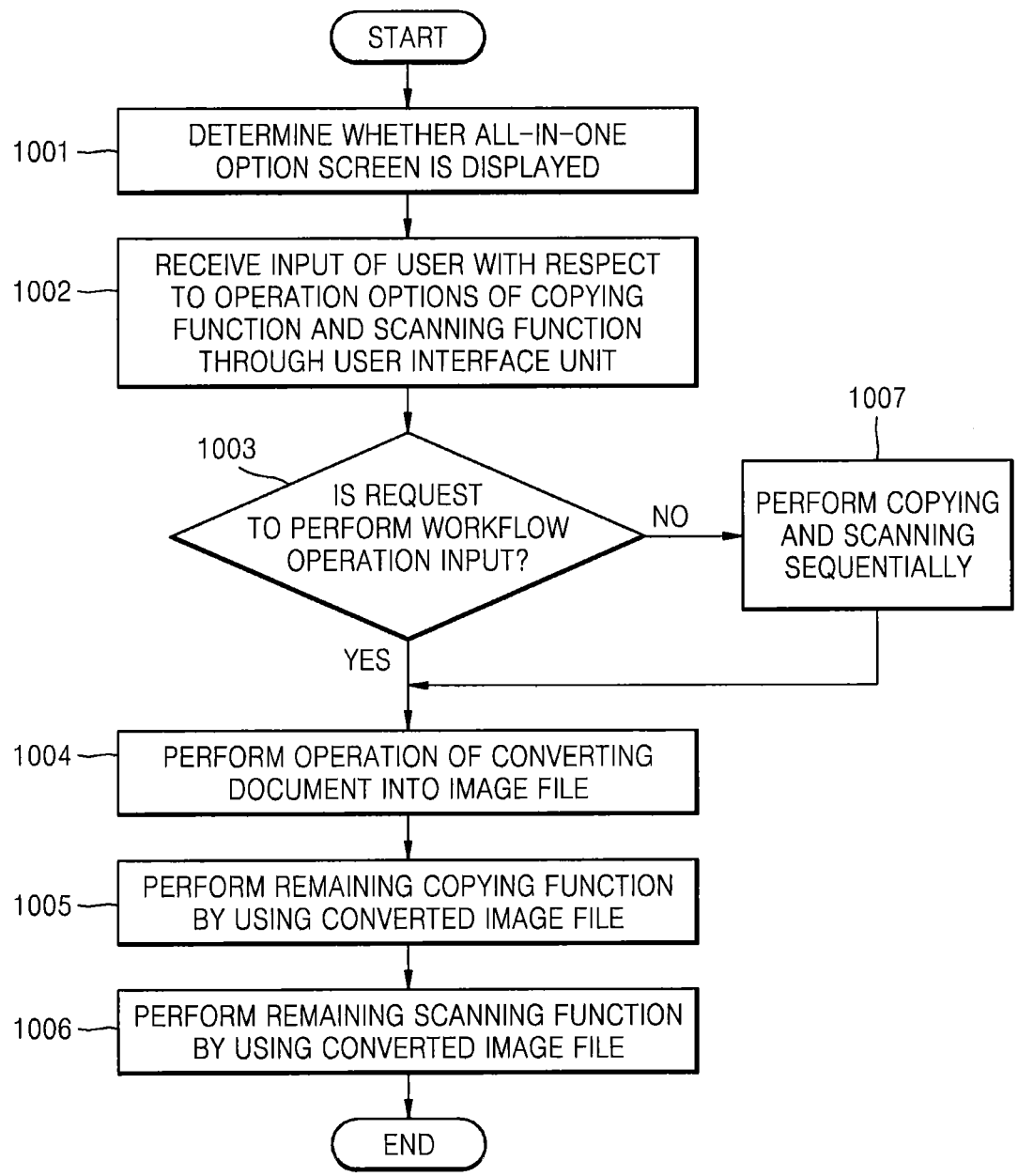
FIG. 10 is a flowchart illustrating a method of performing a copying function and a scanning function in a work-flow operation based on operation options input through a user interface unit.

FIG. 10 is a flowchart illustrating a method of performing the copying function and the scanning function in the work flow operation based on the operation options input through the user interface unit 10 according to the embodiment of the present invention.

In operation S1001, the processor 20 determines whether the option screen of FIG. 4 is displayed on the user interface unit 10 according to the execution of the all-in-one program.

In operation S1002, the user interface unit 10 receives the input of the user about the operation options of the copying function and the scanning function.

In operation S1003, the processor 20 determines whether the request to perform the work flow operation displayed on the user interface unit 10 is input.

In operation S1004, the processor 20 controls an operation of converting a document into an image file to be performed.

In operation S1005, the processor 20 controls remaining copying functions to be performed by using the converted image file.

In operation S1006, the processor 20 controls remaining scanning functions to be performed by using the converted image file.

In operation S1007, the processor 20 controls the copying function and the scanning function to be performed sequentially.

Figure 11:
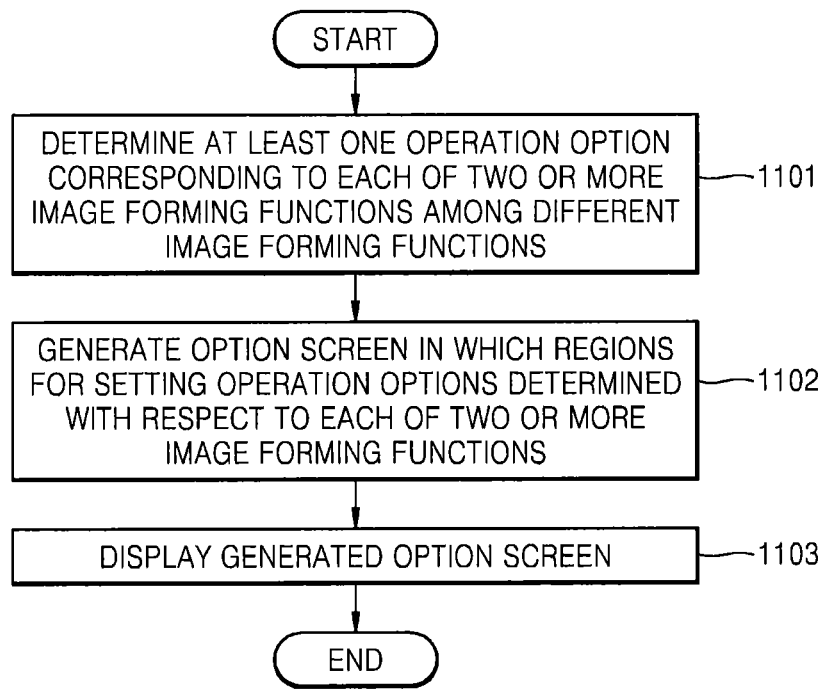
FIG. 11 is a flowchart illustrating a method of displaying an option screen in an image forming apparatus according to an embodiment of the present invention.

FIG. 11 is a flowchart illustrating a method of displaying the option screen in the image forming apparatus 1 according to the embodiment of the present invention. Referring to FIG. 11, the method illustrated in FIG. 11 consists of the processes that are time-serially performed in the image forming apparatus 1 of FIG. 1. Therefore, the descriptions about the image forming apparatus 1 of FIG. 1 may be applied to the method illustrated in FIG. 11, even if they are not provided here.

In operation S1101, the option determination unit 210 determines at least one operation option corresponding to each of two or more image forming functions among the image forming functions provided by the image forming apparatus 1.

In operation S1102, the screen generation unit 220 generates an option screen in which regions for setting the operation options set with respect to each of the two or more image forming functions are arranged in the same screen.

In operation S1103, the user interface unit 20 displays the generated option screen.

The embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), and optical recording media (e.g., CD-ROMs, or DVDs).

According to the embodiments of the present disclosure, the operation options with respect to each of the various kinds of image forming functions may be set once while minimizing the change or movement of the screen on the user interface unit. That is, the all-in-one screen, in which the operation options relating to various kinds of image forming functions may be displayed in the same screen, is provided, and thus the user may input the operation options easily and rapidly through one screen.

While the present disclosure has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of displaying an option screen in an image forming apparatus, the method comprising:
    determining at least one operation option corresponding to each of two or more image forming functions, among image forming functions provided by the image forming apparatus, the at least one operation option being applied to a performance of the respective image forming functions;
    generating an option screen in which regions for setting the operation options determined with respect to the two or more image forming functions are arranged in a same screen; and
    displaying the generated option screen through a user interface unit.

2. The method of claim 1, wherein the determining of the at least one operation option is performed based on kinds of operation options that are essentially input by a user in order to perform the image forming functions.

3. The method of claim 2, further comprising displaying an error message notifying the user that the essential operation options are not set, when the image forming functions are requested to be performed in a state where the essential operation options are not set.

4. The method of claim 1, further comprising editing the operation options that are arranged in the option screen according to the input of the user,
    wherein the determining of the at least one operation option is performed based on the edition result.

5. The method of claim 1, wherein the determining of the at least one operation option is performed in consideration of a size of the screen.

6. The method of claim 1, wherein the generating of the option screen comprises further arranging a button for changing the options screen in the option screen for setting other operation options besides the determined operation options.

7. The method of claim 1, wherein the generating of the option screen comprises further arranging a button for selecting an activation of each of the two or more image forming functions.

8. The method of claim 1, wherein the generating of the option screen comprises further arranging a button for executing a work flow operation, by which the image forming functions are performed at the same time.

9. The method of claim 1, wherein the generating of the option screen comprises further arranging a button for initiating each of the two or more image forming functions in the option screen.

10. The method of claim 1, further comprising:
receiving an input of the user with respect to the operation options through the option screen; and
controlling the image forming functions to be performed based on the received input of the user with respect to the operation options.

11. The method of claim 10, further comprising executing a work flow operation, in which the two or more image forming functions are performed at the same time, when the operation options of the two or more image forming functions are set together.

12. The method of claim 11, wherein the executing of the work flow operation comprises performing an image forming operation that is repeated in the two or more image forming functions once.

13. The method of claim 1, wherein the image forming functions comprise at least two or more among a printing function, a copying function, a scanning function, a fax function, and an e-mail transmission function.

14. A non-transitory computer readable recording medium having embodied thereon a program for executing the method according to claim 1.

15. An image forming apparatus displaying an option screen, the image forming apparatus comprising:

an option determination unit for determining at least one operation option corresponding to each of two or more image forming functions provided by the image forming apparatus, the at least one operation option being applied to a performance of the respective image forming functions;
a screen generation unit for generating an option screen, in which regions for setting the operation options determined with respect to each of the two or more image forming functions are arranged in the same screen; and
a user interface unit for displaying the generated option screen.

16. The image forming apparatus of claim 15, wherein the option determination unit determines the at least one operation option based on kinds of the operation options that are essentially input by a user in order to perform the image forming functions.

17. The image forming apparatus of claim 15, further comprising an option edit unit for editing the operation options that will be arranged in the option screen according to an input of the user,
wherein the option determination unit determines the at least one operation option based on the edition result.

18. The image forming apparatus of claim 15, wherein the image generation unit generates the option screen by further arranging at least one of a button for changing the option screen in order to set other operation options besides the determined operation options, a button for selecting an activation of each of the two or more image forming functions, a button for executing a work flow operation, and a button for initiating the operation of each of the two or more image forming functions in the option screen.

19. The image forming apparatus of claim 15, further comprising a controller for controlling the image forming functions to be performed based on the input of the user received through the user interface unit.

20. The image forming apparatus of claim 19, wherein the controller executes the work flow operation for performing the two or more image forming functions at the same time, when the operation options of the two or more image forming functions are set together.

* * * * *